United States Patent
Beckett et al.

(10) Patent No.: US 9,258,676 B2
(45) Date of Patent: Feb. 9, 2016

(54) MOBILE DEVICE FOR CREATING, MANAGING AND SHARING LOCATION INFORMATION

(71) Applicant: BlackBerry Limited, Waterloo (CA)

(72) Inventors: Jason Christopher Beckett, Kitchener (CA); Raymond Lee Canton, Ottawa (CA); Siamak Sartipi, Waterloo (CA)

(73) Assignee: BlackBerry Limited, Waterloo, CA (US)

( * ) Notice: Subject to any disclaimer, the term of this patent is extended or adjusted under 35 U.S.C. 154(b) by 208 days.

(21) Appl. No.: 13/752,944

(22) Filed: Jan. 29, 2013

(65) Prior Publication Data

US 2014/0213304 A1     Jul. 31, 2014

(51) Int. Cl.
*H04W 24/00* (2009.01)
*H04W 4/02* (2009.01)
*G01C 21/32* (2006.01)
*G01C 21/36* (2006.01)

(52) U.S. Cl.
CPC ............... *H04W 4/021* (2013.01); *G01C 21/32* (2013.01); *G01C 21/3679* (2013.01)

(58) Field of Classification Search
CPC .............................. H04W 4/021; H04W 4/023
USPC .......... 455/456.6, 414.1, 456.1, 456.2, 456.3, 455/456.5, 457
See application file for complete search history.

(56) References Cited

U.S. PATENT DOCUMENTS

| | | | |
|---|---|---|---|
| 7,860,517 B1 | 12/2010 | Patoskie et al. | |
| 2003/0182052 A1 | 9/2003 | DeLorme et al. | |
| 2005/0278371 A1 | 12/2005 | Funk et al. | |
| 2009/0088968 A1 | 4/2009 | Tsutsui | |
| 2009/0143079 A1 | 6/2009 | Klassen et al. | |
| 2009/0177386 A1 | 7/2009 | Haase | |
| 2010/0318293 A1* | 12/2010 | Brush et al. | 701/211 |
| 2010/0332116 A1 | 12/2010 | Sakashita | |
| 2011/0022393 A1* | 1/2011 | Waller et al. | 704/270 |
| 2011/0051665 A1* | 3/2011 | Huang | 370/328 |
| 2012/0236835 A1* | 9/2012 | Rokusek et al. | 370/338 |
| 2012/0302258 A1* | 11/2012 | Pai et al. | 455/456.2 |
| 2013/0059606 A1* | 3/2013 | Pujol | 455/456.3 |
| 2014/0019246 A1* | 1/2014 | Fraccaroli | 705/14.58 |
| 2014/0148135 A1* | 5/2014 | Haney | 455/414.1 |
| 2014/0221021 A1* | 8/2014 | Zazula | 455/456.3 |

FOREIGN PATENT DOCUMENTS

EP     2213979 A1     8/2010

OTHER PUBLICATIONS

European Search Report dated May 30, 2014 which issued in corresponding EP Application No. 13157052.5.

* cited by examiner

*Primary Examiner* — Barry Taylor
(74) *Attorney, Agent, or Firm* — Moffat & Co.

(57) ABSTRACT

A method performed by a mobile device entails determining a current location of the mobile device, storing the current location as a breadcrumb (recorded) location of the mobile device, and performing an action with respect to the breadcrumb location when the mobile device has moved away from the breadcrumb location. The action may entail sharing the breadcrumb location with another device. Reverse geocoded address information may be provided for the breadcrumb locations.

25 Claims, 15 Drawing Sheets

MOBILE DEVICE FOR CREATING, MANAGING AND SHARING LOCATION INFORMATION

CROSS-REFERENCE TO RELATED APPLICATIONS

This is the first application filed for the present technology.

TECHNICAL FIELD

The present technology relates generally to mobile devices and, in particular, to creating, managing and sharing of location information using a mobile device.

BACKGROUND

Location-aware mobile devices, i.e. mobile devices having a position-determining capability, can provide a variety of useful functions such as navigation and location-based services. Sharing a current location of the mobile device with a contact or other device may be accomplished by sending location information to a location-management server or directly to the other device. Although this technology permits the relative locations to be plotted on a map, the address information associated with those locations is difficult to keep fresh as this requires very frequent calls to a reverse-geocoding server for updated address information as the device moves to new locations. Improved technologies for creating, managing and sharing location information are thus highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides a mobile device, computer-implemented method and computer-readable medium for creating, managing and sharing location information in the form of breadcrumb locations that represent recent or previous locations of a mobile device or of another device with which the mobile device is sharing location information.

Accordingly, one aspect of the present technology is a method performed by a mobile device that entails determining a current location of the mobile device, storing the current location as a breadcrumb location of the mobile device, and performing an action with respect to the breadcrumb location when the mobile device has moved away from the breadcrumb location. Such an action may be performed while the device is moving away from the breadcrumb location or at some later time.

Another aspect of the present technology is a computer-readable medium comprising instructions in code which when loaded into a memory and executed by a processor of a mobile device cause the mobile device to determine a current location of the mobile device, store the current location as a breadcrumb location of the mobile device, and perform an action with respect to the breadcrumb location when the mobile device has moved away from the breadcrumb location.

Another aspect of the present technology is a mobile device having a position-determining subsystem for determining a current location of the mobile device, a memory for storing the current location as a breadcrumb location of the mobile device, and a processor coupled to the memory for performing an action with respect to the breadcrumb location when the mobile device has moved away from the breadcrumb location.

The details and particulars of these aspects of the technology will now be described below, by way of example, with reference to the drawings.

Device and System

Figure 1:
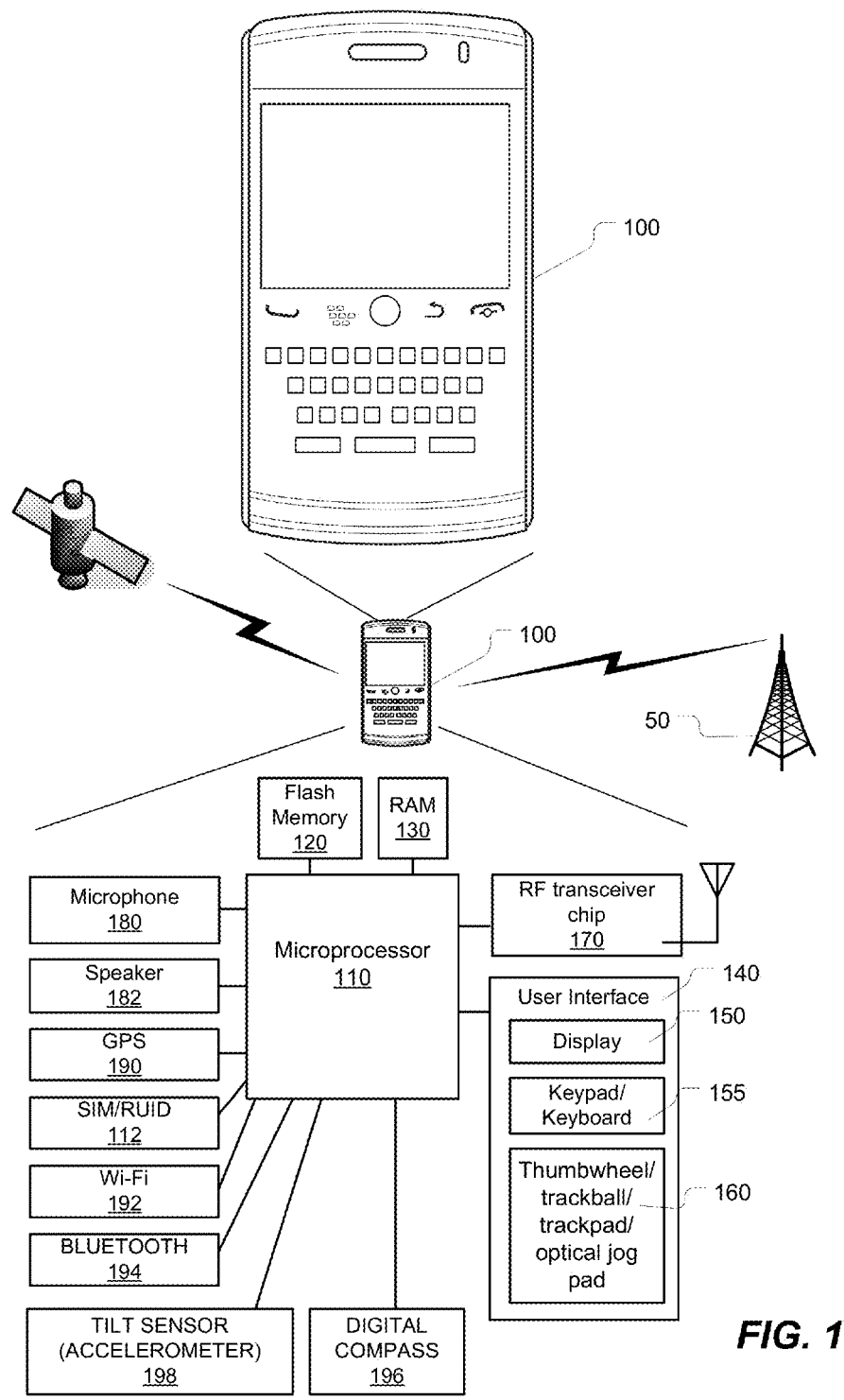
FIG. 1 is a depiction of a mobile device on which the present technology may be implemented, the depiction including a schematic depiction of some components of the mobile device.

FIG. 1 is a depiction of a mobile device as one example of a computing device on which the present technology may be implemented. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the mobile device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

Alternatively, where the computing device is a wired device like a desktop computer, laptop, etc., the transceiver 170 of the computing device 100 may be a modem or equivalent (for wired communications) using, for example, the TCP/IP protocol for Internet data communication. The mobile device 100 may also include one or more ports for wired connections, e.g. USB, HDMI, FireWire (IEEE 1394), etc.

The mobile device 100 includes a speech-recognition subsystem that has a microphone 180 for transforming voice input in the form of sound waves into an electrical signal. The electrical signal is then processed by a speech-recognition module (digital signal processor) to determine keywords or phrases from the voice input.

Optionally, the mobile device 100 may include a speaker 182 and/or an earphone jack.

Optionally, the mobile device 100 may also optionally include a positioning subsystem such as a Global Positioning System (GPS) receiver 190 (e.g. in the form of a chip or chipset) for receiving GPS radio signals transmitted from one or more orbiting GPS satellites.

Optionally, the mobile device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

As noted above, a mobile device (e.g. a wireless communications device) is one example of a computing device 100 on which the present technology may be implemented. Other computing devices 100 may include desktop personal computers, laptops, palmtops, tablets, game consoles, or other such devices.

To implement the breadcrumb technology of the present disclosure, the mobile device 100 depicted by way of example in FIG. 1 uses the position-determining subsystem 190, e.g. GPS, to determine a current location of the mobile device 100. The memory 120, 130 stores or records the current location as a 'breadcrumb' location of the mobile device. A breadcrumb location (or "recorded location") is a location which is to be stored so that further action(s) may be taken with regard to that stored location. Since the action taken with regard to the location is performed after the device has moved away from the current location, the breadcrumb location is a record or marker of a previous, different or non-current location. This enables the device to remember important or significant locations, to obtain address information for these key locations and to minimize the number of calls to a reverse-geocoding server. Important locations may be locations that the user wishes to remember (e.g. where he parked his car), customized points of interest, rendezvous locations, or places to be shared with others via social media. By "dropping a breadcrumb" (recording the location), the device stores the coordinates and further optionally obtains address information for the location. This may be used in a variety of applications and situations, e.g. sending an interesting location to a friend, uploading a place to a website or places repository, reporting the site of an accident, crime or news-worthy event.

The processor 110 coupled to the memory 120, 130 enables the device to perform an action (e.g. sharing the location) with respect to the breadcrumb location when the mobile device 100 has moved away from the breadcrumb location, i.e. when the device has moved to a new current location. In one embodiment, the display 150 is used for displaying a map presenting both a current location indicator (which may be an avatar of the user) representing the current location of the mobile device and one or more breadcrumb location indicators representing respective breadcrumb locations representing recent locations that were recorded or saved as such by the device, either automatically or in response to user input.

In one embodiment, the radiofrequency transceiver 170 of the mobile device 100 is used for receiving reverse-geocoded address information for the breadcrumb location. The mobile device may obtain the reverse-geocoded address information from a reverse-geocoding server 230 such as the one shown by way of example in FIG. 2. The mobile device then displays the address information received from the reverse-geocoding server 230. The address information may be displayed onscreen in association with a breadcrumb location indicator of the breadcrumb location on the display of the mobile device.

Figure 2:
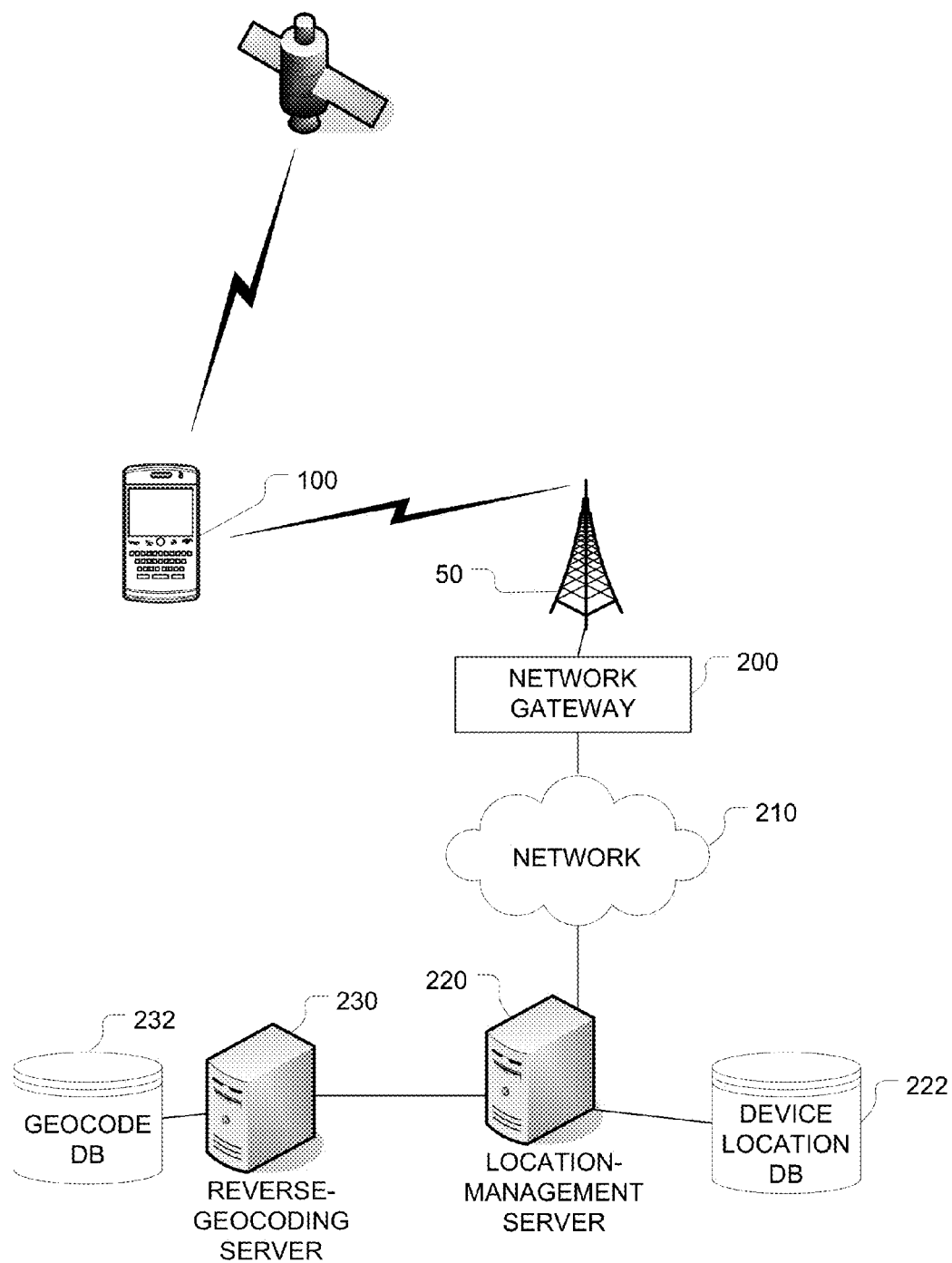
FIG. 2 is a depiction of a system for creating, sharing and managing breadcrumb locations with which are associated address information in accordance with an implementation of the present technology.

As depicted in FIG. 2, mobile device 100 may communicate with the reverse-geocoding server 230 via a location-management server 220 that stores, shares and manages location information about the mobile device and other devices. This location-management server may, for example, determine which devices are to share data and to apply any privacy filters or privacy parameters relating to location information. As shown by way of example, the mobile device may communicate with the location-management server through base station 50, network gateway 200, and a data network 210 (e.g. the Internet). As further illustrated by way of example, the location-management server 220 may optionally have a separate device location database 222 although the device location database may be stored within a local memory of the location-management server 220. Likewise, the reverse-geocoding server 230 may optionally have a separate geocode database 232 although the geocode database may be stored within a local memory of the reverse-geocoding server.

Figure 3:
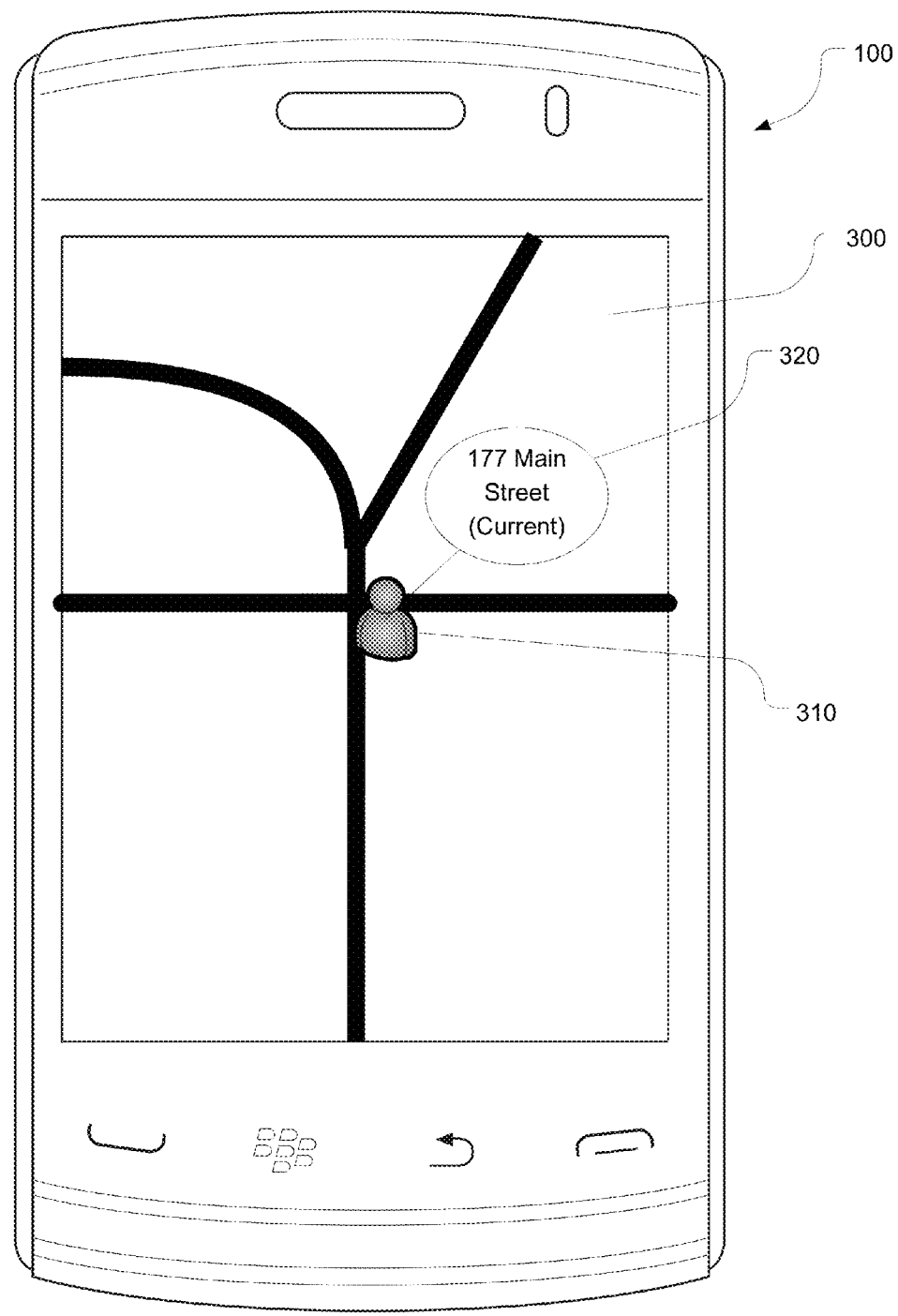
FIG. 3 is a depiction of a mobile device displaying a map presenting a graphical current location indicator.

FIG. 3 a depiction of a mobile device 100 displaying a map 300 presenting a graphical current location indicator 310. The graphical current location indicator may, in some embodiments, be an avatar that distinguishes the user from other users, contacts, friends, or buddies that are also showing on the map. As shown by way of example in FIG. 3, location information in the form of address information may be displayed in a callout or text bubble 320 (also referred to as a text field). Optionally, there may be indication, verbal or symbolic or graphical, that the address information is current as opposed to a recent location (or breadcrumb location).

Figure 4:
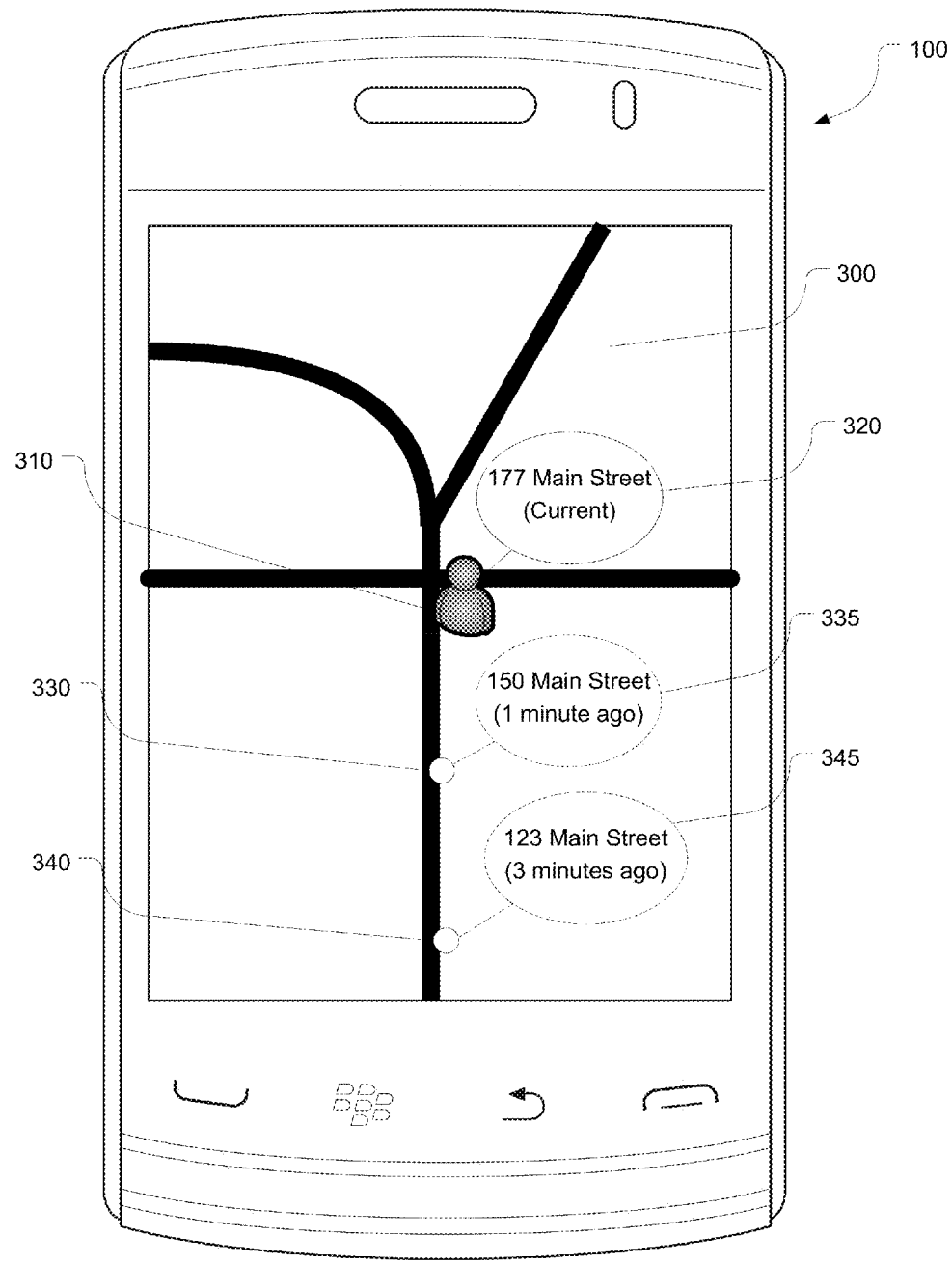
FIG. 4 is a depiction of the mobile device of FIG. 3 further displaying breadcrumb locations.
Figure 5:
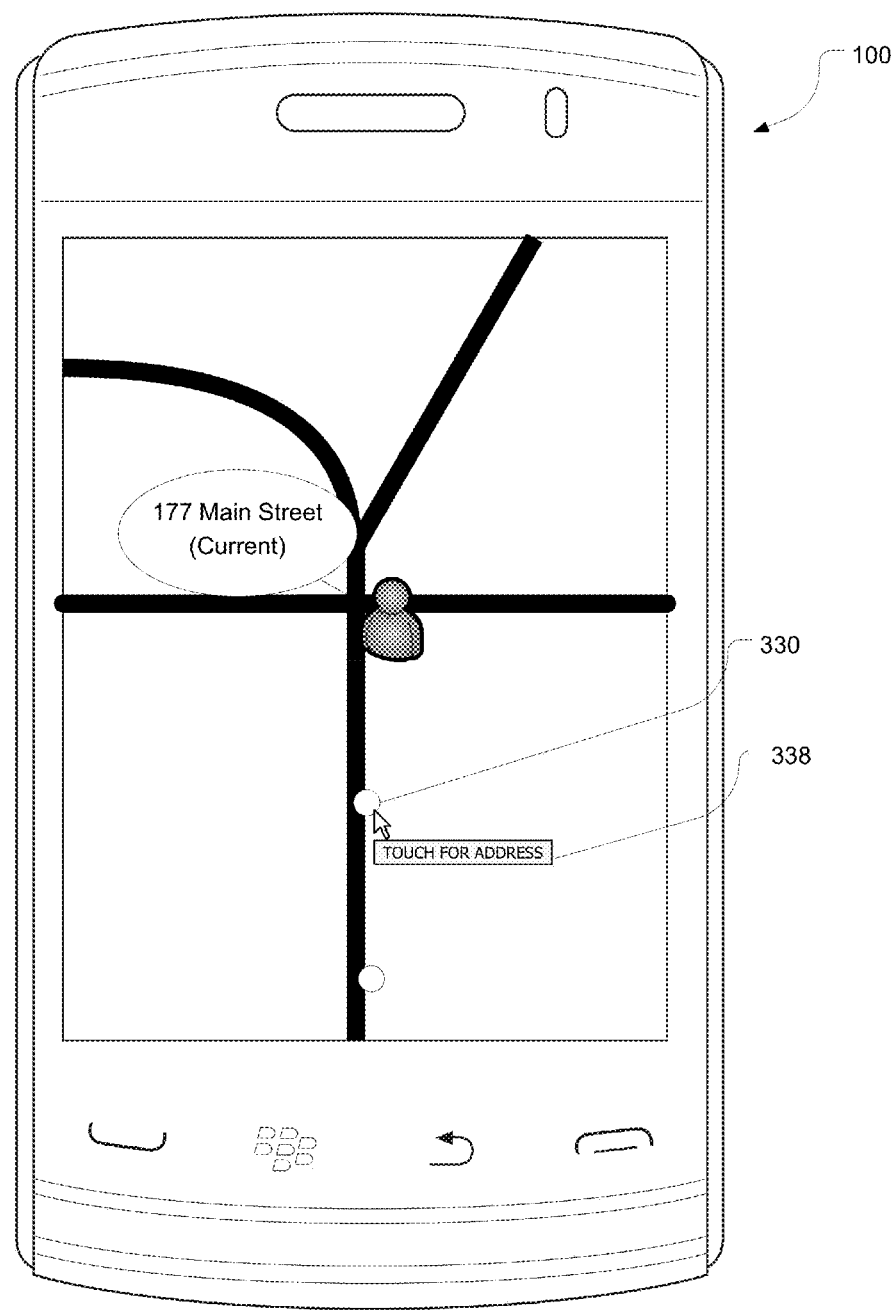
FIG. 5 is a depiction of the mobile device of FIG. 4 further displaying a prompt to display address information.

In one implementation, which is depicted by way of example in FIG. 4, the mobile device 100 further displays breadcrumb locations representing recent recorded locations of the mobile device. In FIG. 4, there are two breadcrumb locations indicated by breadcrumb location indicators 330, 340 which represent two specific recent locations of the mobile device which were recorded by the mobile device and for which reverse geocoding data was obtained. In this example, there are two breadcrumb locations although in other cases the number of breadcrumb locations may vary. The mobile device may display the breadcrumb locations automatically or only in response to user input. Optionally, as shown in FIG. 4, the address information associated each breadcrumb location may be displayed in a text bubble or callout 335, 345 or in any other manner. The address information may be displayed automatically or in response to user input, e.g. in response to the user clicking or touching on a breadcrumb location indicator, in response to a voice command, etc. FIG. 5 depicts an example in which the device displays a prompt when the user hovers over a breadcrumb. In this particular example, the device display a prompt 338 prompting the user to touch the breadcrumb location indicator 330 to obtain the address information associated with the location of that breadcrumb. The address information is, in most embodiments, already reverse-geocoded and stored locally in the memory of the mobile device for fast retrieval and display.

Figure 6:
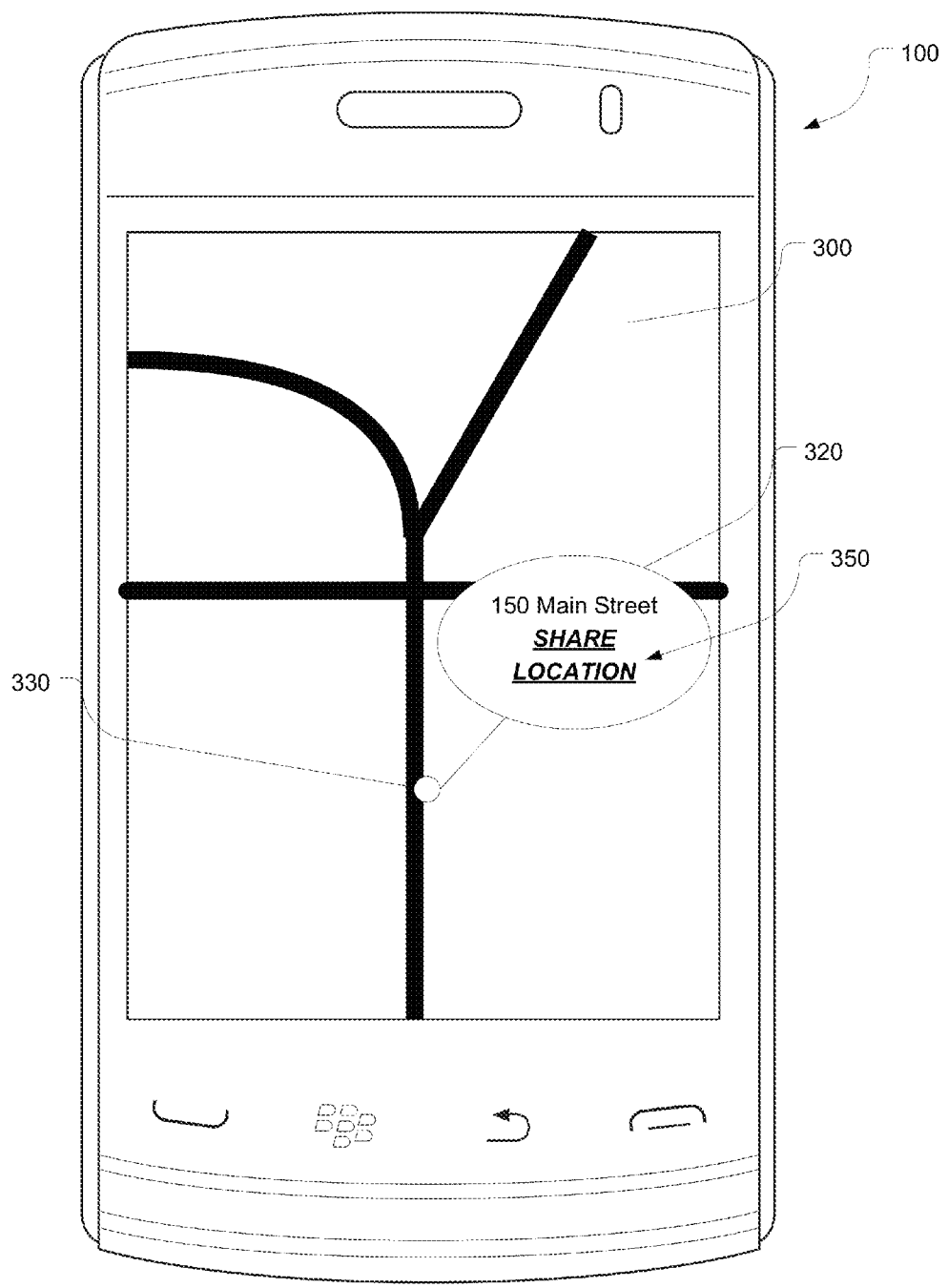
FIG. 6 is a depiction of a mobile device displaying a user-selectable interface element for sharing a selected breadcrumb location.
Figure 7:
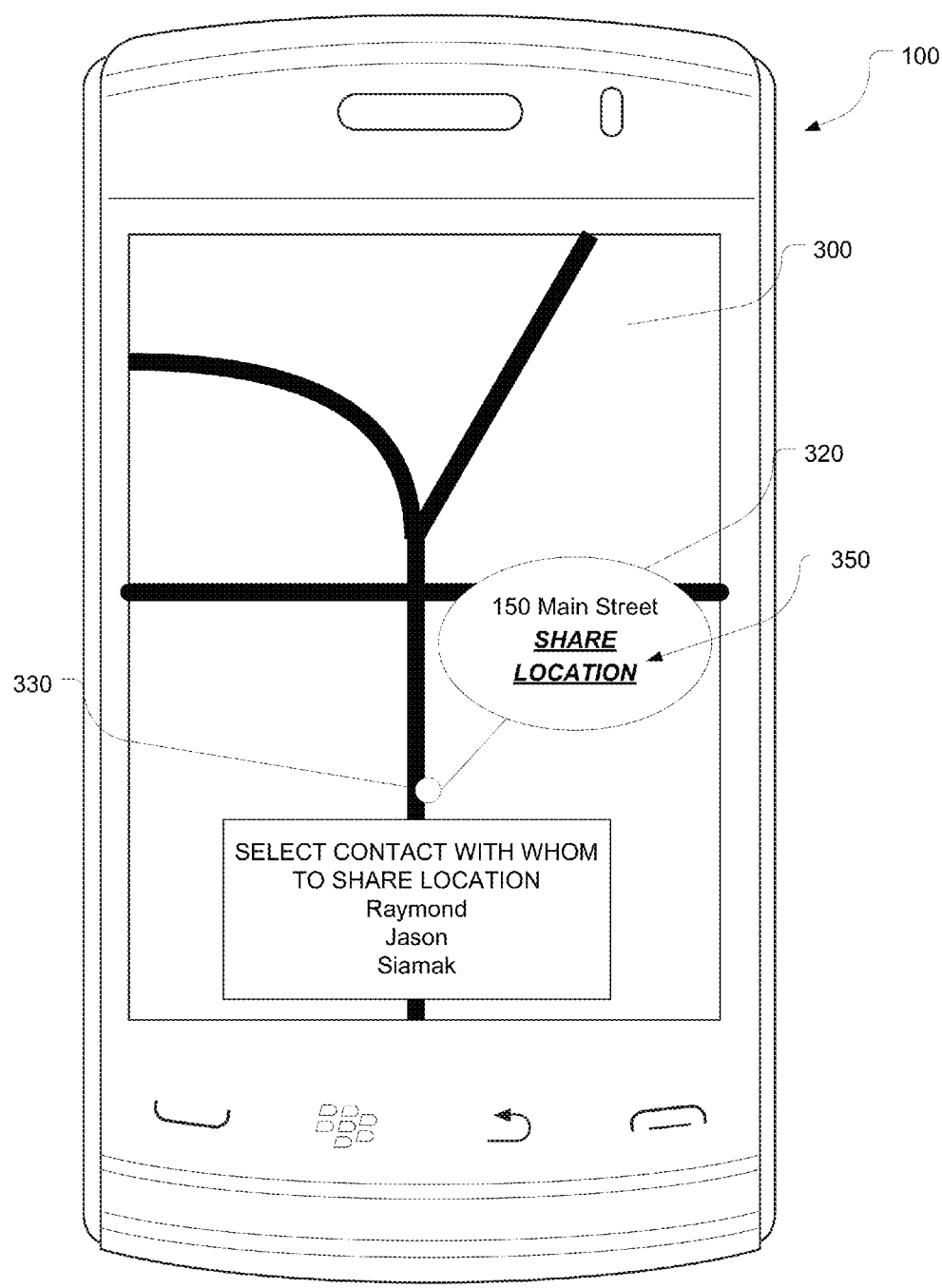
FIG. 7 is a depiction of a mobile device further displaying a list of recipients for receiving the selected breadcrumb location.

FIG. 6 depicts one specific embodiment of the mobile device 100 in which the device displays a user-selectable interface element 350 (or simply "user interface element") for sharing the breadcrumb location. FIG. 7 depicts a list 360 of recipients or recipient devices for receiving the breadcrumb location. The breadcrumb location may be shared via e-mail, instant message, SMS, MMS, or any other mode of data communication. The recipients may be selected from an address book, from an IM buddy list, from a social networking application or from other sources. The device may define user groups or mailing lists of recipients for receiving the shared breadcrumbs.

Figure 8:
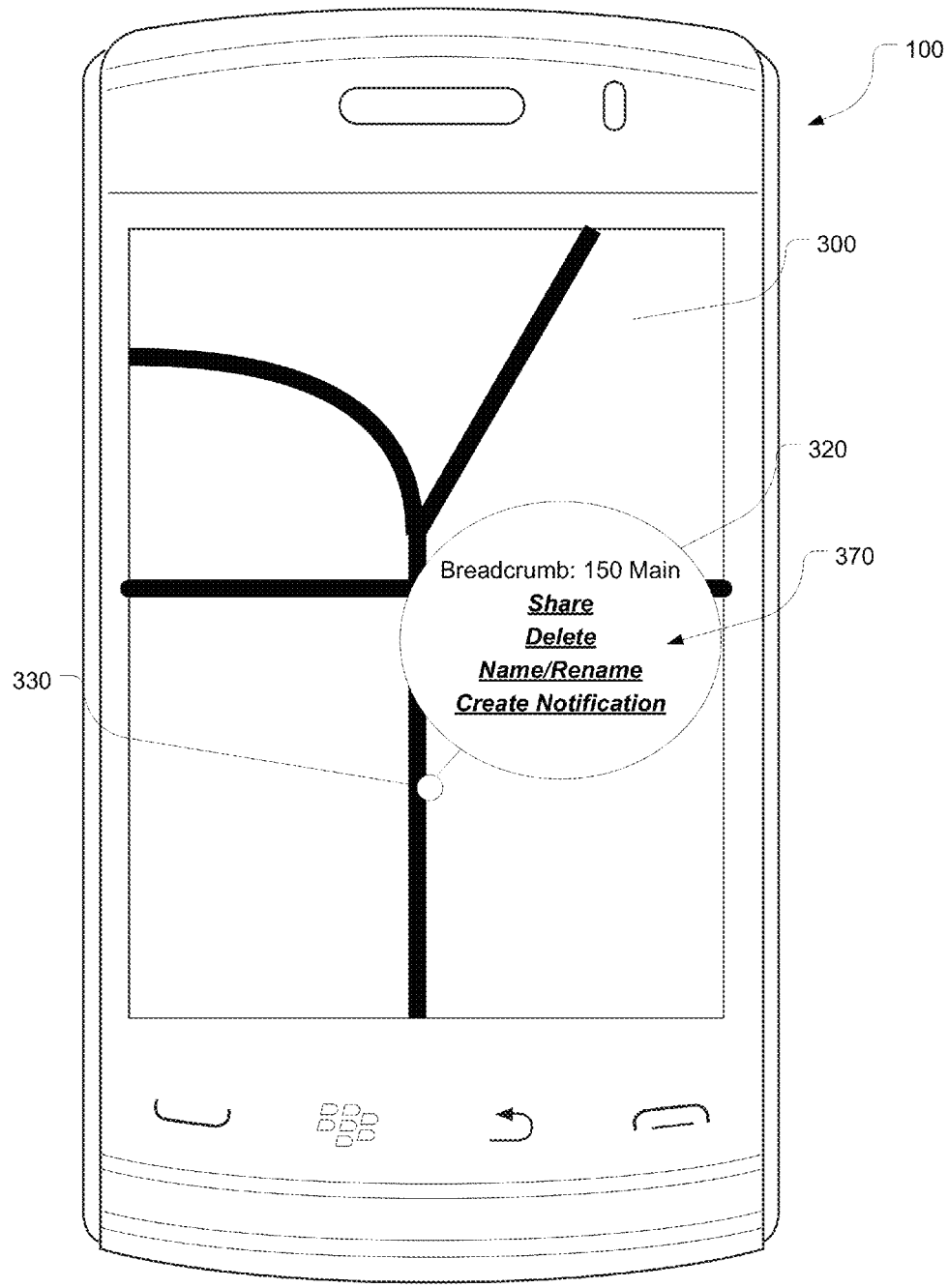
FIG. 8 is a depiction of a mobile device displaying a menu of actions that may be performed in relation to a selected breadcrumb location.

The user interface element 350 may be part of a menu 370 of user-selectable options or menu items as shown by way of example in FIG. 8. The menu 370 may include options for sharing (or sending) the breadcrumb location (either as raw data or as reverse geocoded address data), deleting the breadcrumb location, naming or renaming the breadcrumb location, or defining notifications related to the breadcrumb location, as will be elaborated below. The menu 370 of options may be displayed inside the callout or text bubble or it may be external to the callout/bubble. Naming and deleting breadcrumbs may be useful after a journey has been completed or at the end of the day when the user reviews his or her route for the day. Breadcrumbs may be named, labelled, annotated, uploaded to a website or places database, or associated with other content. Unwanted breadcrumbs may be deleted.

Figure 9:
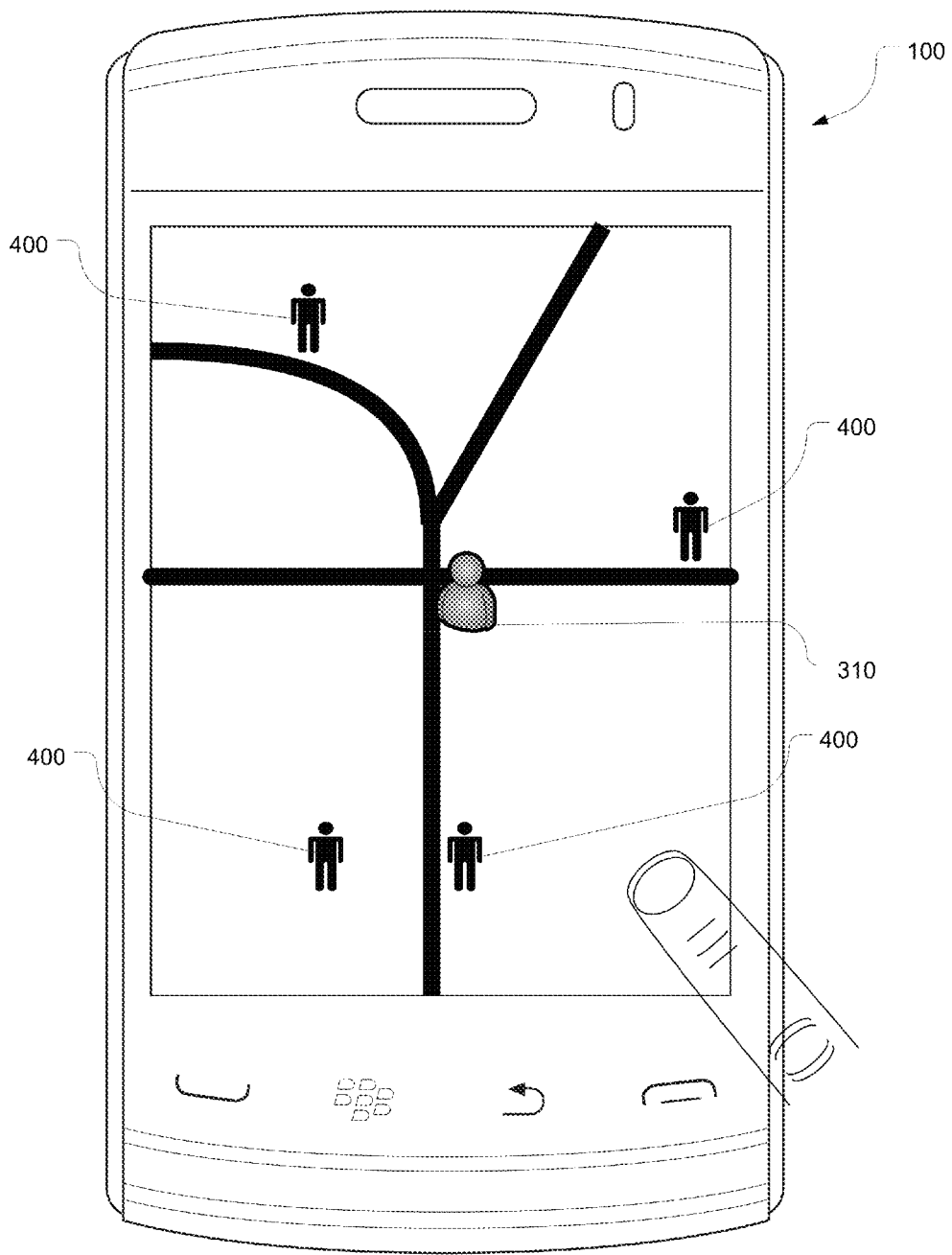
FIG. 9 is a depiction of a mobile device displaying an avatar as a current graphical location indicator and icons representing the current locations of other devices that are sharing location information with the user's mobile device.

In the embodiment depicted by way of example in FIG. 9, the mobile device 100 displays a map presenting an avatar 310 representing a current location of the mobile device and further displaying one or more icons 400 representing respective current locations of other devices that are sharing location information with the mobile device. The avatar 310 and icons 400 may be individually responsive to user input to display breadcrumb locations of either the mobile device and/or of any one of the other devices. Thus, the breadcrumb locations of other devices, not only the user's own device, may be displayed, shared, named, deleted, or otherwise managed by the user, subject to any restrictions or limitations imposed on the data by the other device that is sharing the data. Although these are illustrated as being identical in FIG. 9, the icons may actually each be unique to distinguish one contact from another. Names, colours, words, labels, or any other graphical indication may be employed to distinguish one icon from another.

Figure 10:
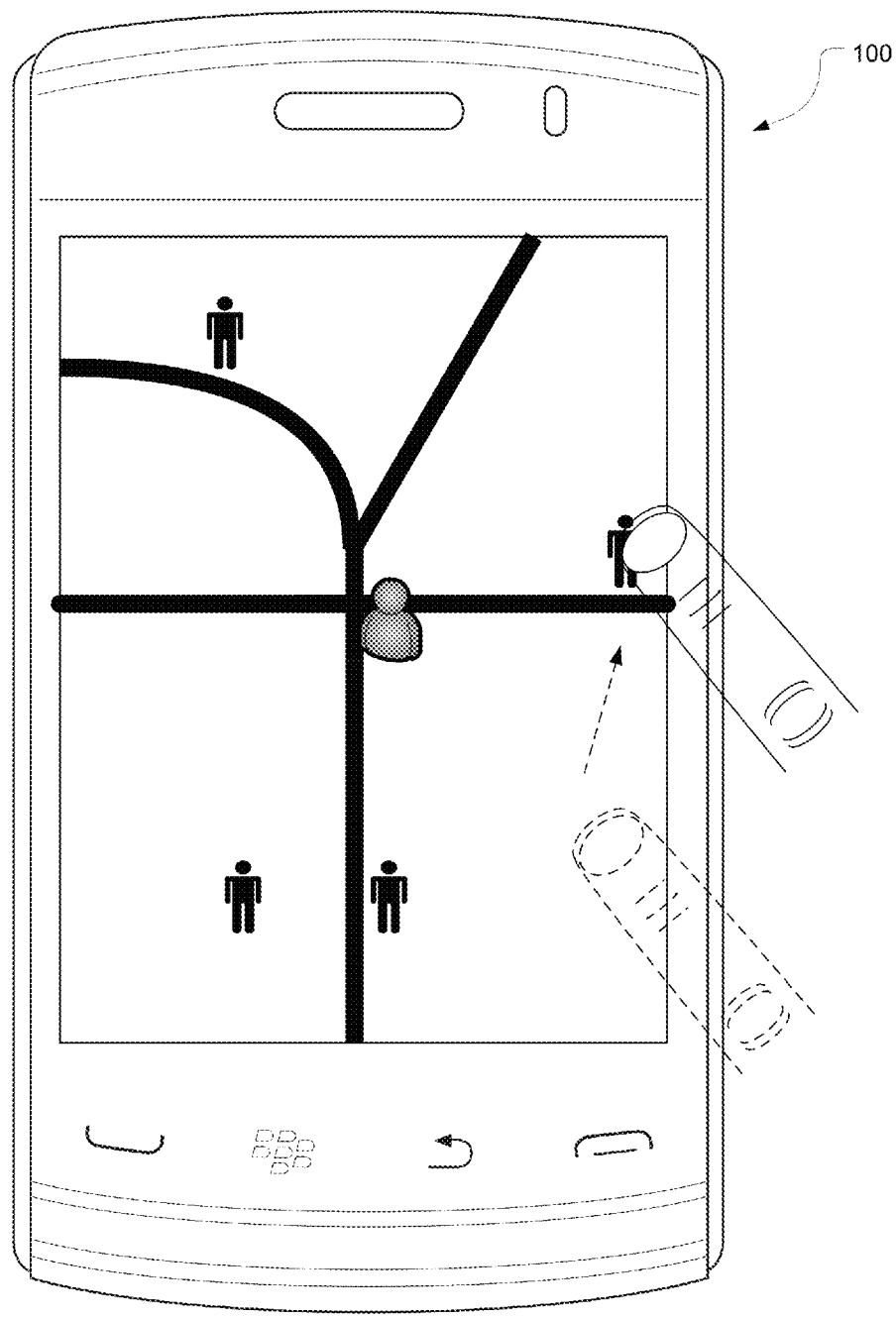
FIG. 10 depicts a mobile device receiving touch input on an icon.
Figure 11:
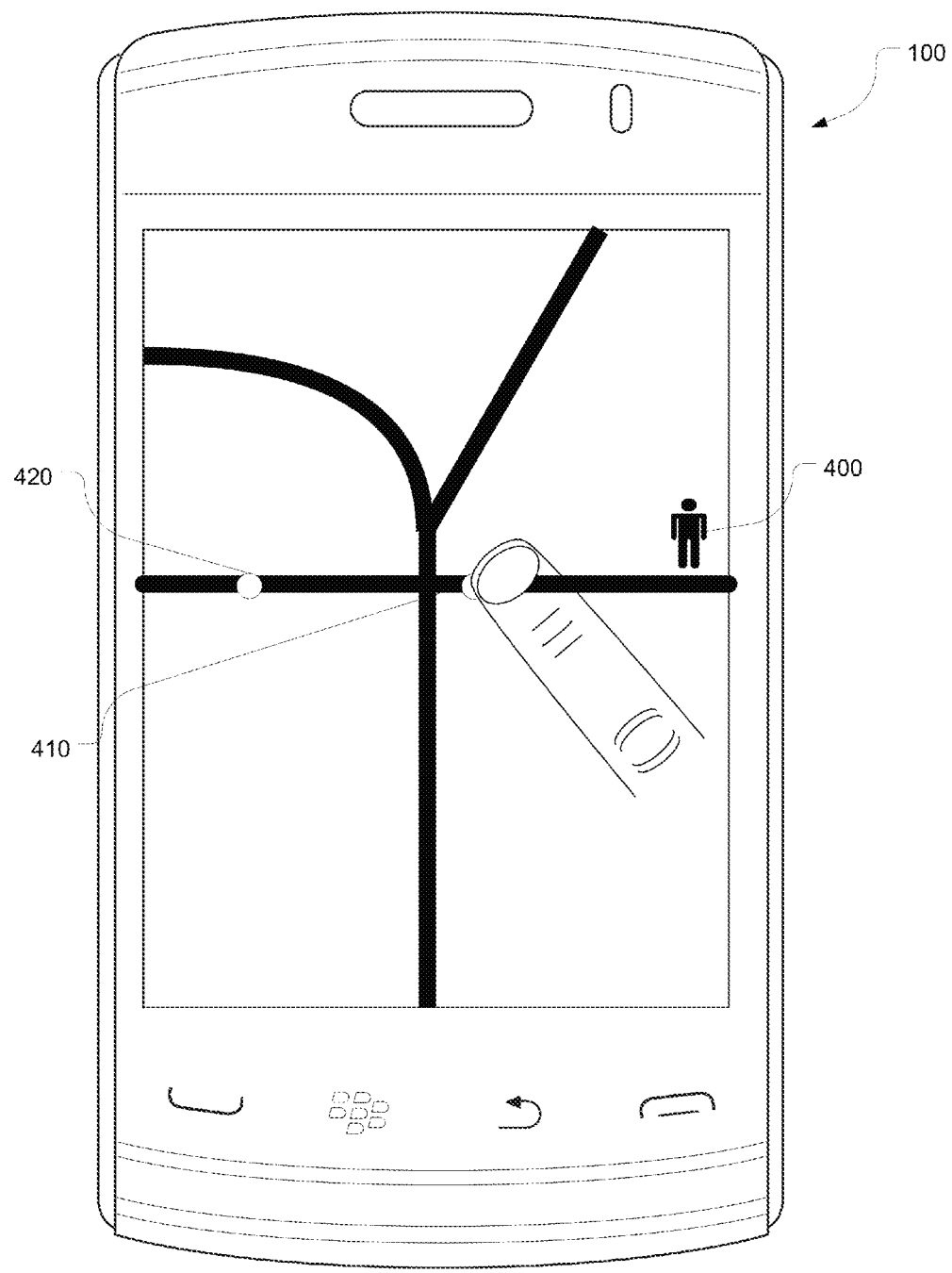
FIG. 11 depicts the mobile device of FIG. 10 subsequently displaying the breadcrumb location indicators in response to the touch input on the icon.
Figure 12:
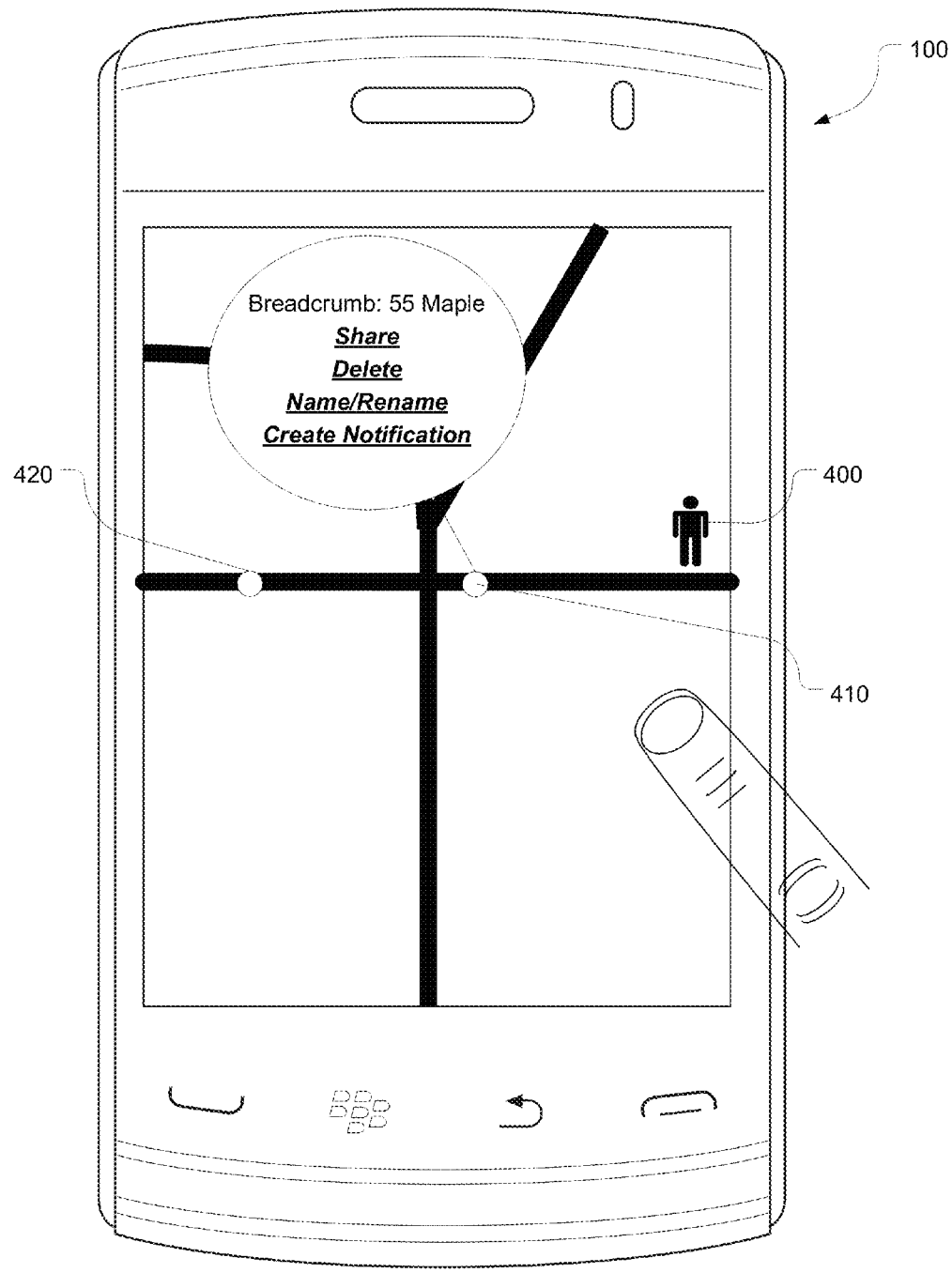
FIG. 12 depicts the displaying of a menu of user-selectable options for performing actions in relation to a selected breadcrumb location.

As shown in FIG. 10, the mobile device may receive user input (e.g. touch input) on one of the icons 400. Optionally, in response to this user input, all other icons and/or the user avatar may be removed from the map to simplify the map display as shown in FIG. 11 although the other icons and/or avatar may be preserved on the map in other embodiments. As shown by way of example in FIG. 11, the mobile device may display breadcrumb location indicators 410, 410 corresponding to the breadcrumb locations of the other device associated with the selected icon. Further input on one or more of these breadcrumb location indicators as shown in FIG. 11 may cause the device to display address information (e.g. "55 Maple") and/or one or more user-selectable options for performing an action in relation to the breadcrumb location. For example, as illustrated in FIG. 12, the user-selectable options may include options to share the breadcrumb location, delete the breadcrumb location, name or rename the breadcrumb location or create a notification for a breadcrumb location.

Figure 13:
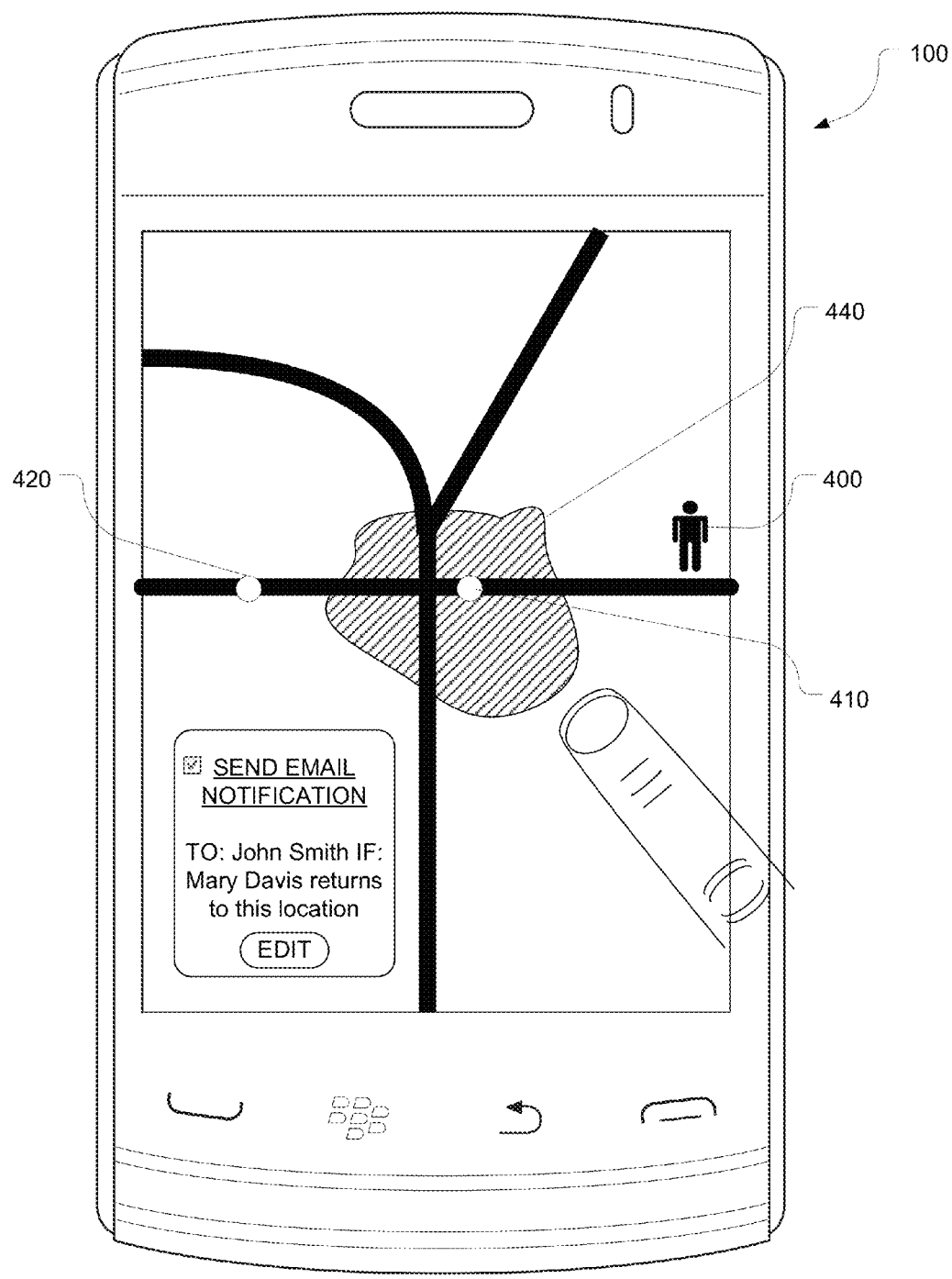
FIG. 13 depicts the drawing of a geofence around a breadcrumb location and the setting of a notification for the breadcrumb.

The mobile device may define or create a notification in response to user input as shown by way of example in FIG. 13. As shown in this example, the user may draw or otherwise graphically indicate a geofence around a breadcrumb. Alternatively, the user may define a radius from the breadcrumb coordinates. The user may define a condition and a conditional action. E.g. the user may configure the device to send a notification via email if the other device or the user associated with the other device returns to the breadcrumb location or enters the geofence around the breadcrumb location. Location-based alerts or notifications may thus be defined in terms of a breadcrumb location. For example, a friend may request an email notification when the device returns to or passes by the breadcrumb location. A breadcrumb location may be set at a workplace garage such that a notification is sent when the mobile device leaves the garage at the end of the day, as a notification to a family member that the user is on the way home. The location-based notification may be coupled with a time filter and/or a date filter and may also take into account calendar entries.

The mobile device 100 and/or location-management server 220 may also be configured to manage location information in terms of privacy filters or privacy parameters. These privacy filters/parameters ensure that the user controls the sharing of data.

Figure 14:
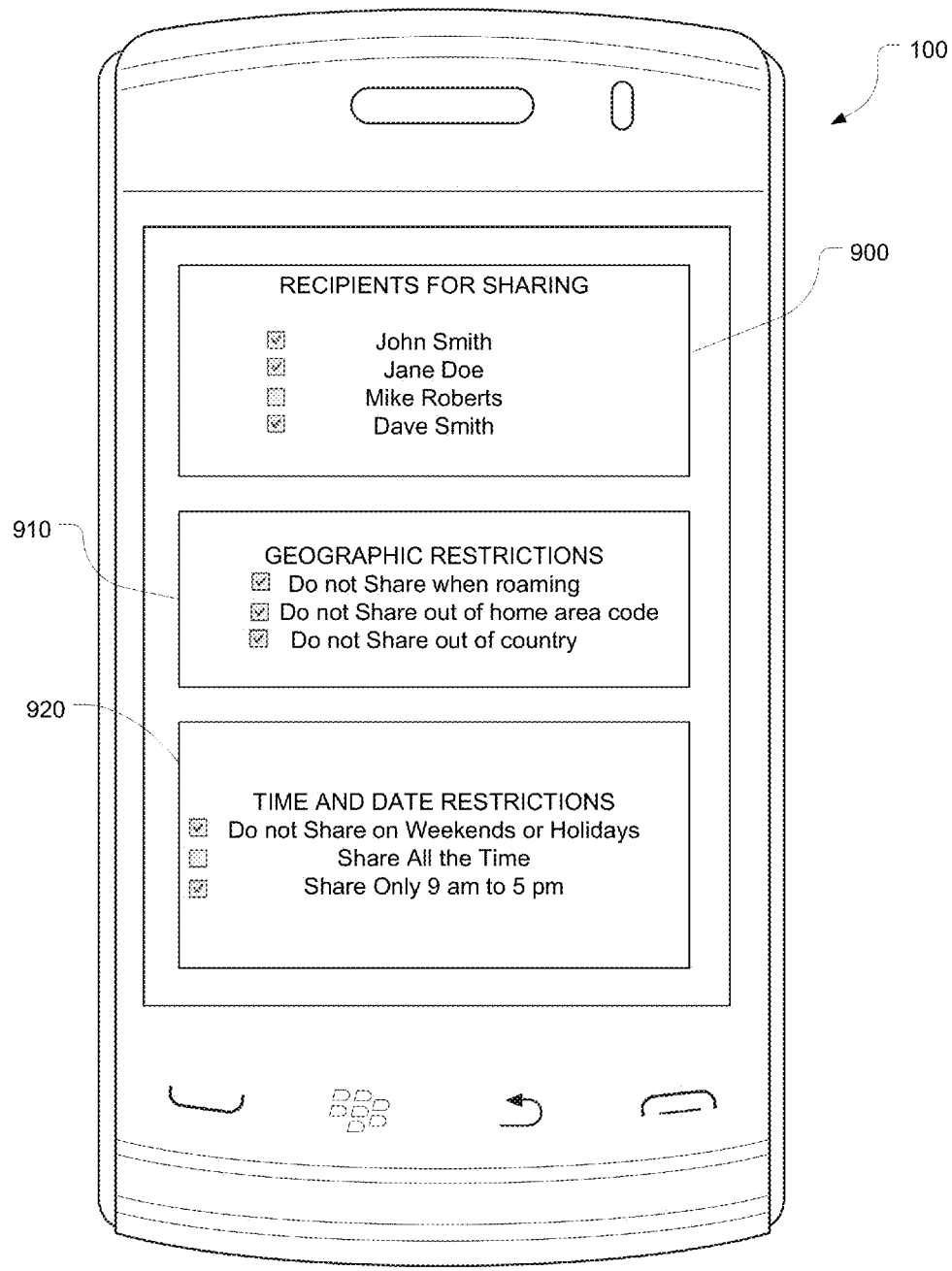
FIG. 14 depicts an example of a privacy filter used to control the sharing of location information.

As depicted by way of example in FIG. 14, the user of the mobile device may specify privacy parameters that will define which data to share using a privacy options page. Such a page may include options for selecting and deselecting recipients or groups or classes of recipients, geographic restrictions, and time and date restrictions.

The mobile device is thus adapted to receive user input to specify privacy parameters relating to how breadcrumb locations are to be transmitted to the server and shared with the other devices. These parameters are communicated to the location-management server 220 to enable the server to share the breadcrumb location with the other devices in accordance with the privacy parameters. The privacy parameters may be time-based and/or location-based. For example, the user may not wish to share data collected on weekends but only on weekdays. The user may not wish to share data collected at certain times of the day. The user may not wish to share data collected in certain geographical areas. All of these privacy parameters may be specified to enable the user to exert complete control over how the data is shared with others.

Method

Figure 15:
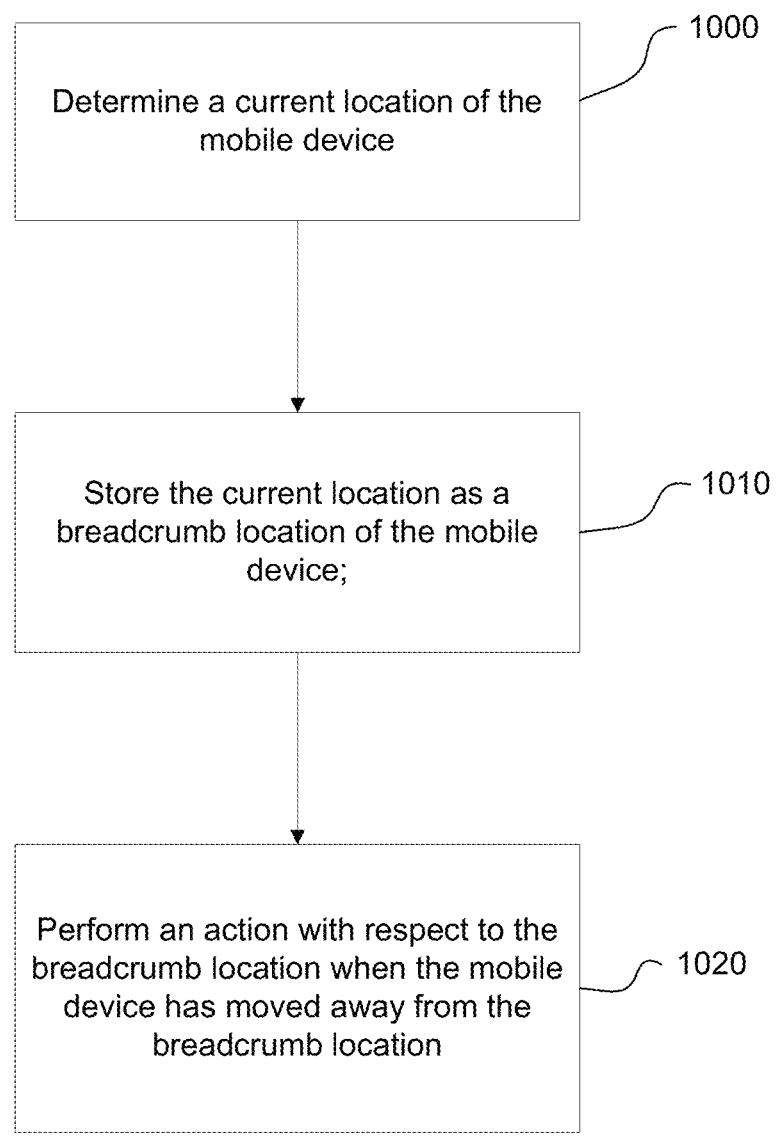
FIG. 15 is a flowchart depicting main steps of a computer-implemented method in accordance with an implementation of the present technology.

Another inventive aspect of the disclosure is a computer-implemented method, which is performed by a mobile device or computing device, for collecting breadcrumb locations and enabling the device to perform actions in relation to the breadcrumb locations, such as, for example, sharing the breadcrumb locations with another device. In general, though, the method is depicted in the flowchart of FIG. 15. This method entails a step 1000 of determining a current location of the mobile device, a step 1010 of storing the current location as a breadcrumb location of the mobile device, and a step 1020 of performing an action with respect to the breadcrumb location when the mobile device has moved away from the breadcrumb location. Storing the breadcrumb may optionally involve sending a reverse-geocoding request containing the location coordinates (to a reverse geocoding server or intermediate location-management server) and then receiving the address of the location in reply.

The method may further entail displaying a map presenting both a current location indicator representing the current location of the mobile device and one or more breadcrumb location indicators representing respective breadcrumb locations.

In one implementation, the method further includes displaying a map presenting a current location indicator representing the current location of the mobile device wherein the current location indicator is a user-selectable indicator that is responsive to user input to cause the mobile device to display one or more breadcrumb locations.

In one embodiment, each breadcrumb location indicator is a user-selectable interface element that is responsive to user input to cause the mobile device to display a selection of actions performable with respect to the breadcrumb location. The selection of actions may include (i) sharing a selected breadcrumb location, (ii) deleting a selected breadcrumb location, (iii) naming a selected breadcrumb location, and/or (iv) defining a location-based alert for a selected breadcrumb location. The location-based alert may involve a notification that the mobile device has returned to the selected breadcrumb location or is within a specified distance of the breadcrumb. This notification may be communicated wirelessly to another device. For example, the notification may be send as an e-mail message, instant message, SMS, MMS, etc. Alternatively, defining the location-based alert may involve drawing a geofence around the breadcrumb location indicator using a lasso (freeform) tool, polygonal shape, circle, etc.

Storing the location may be done in response to user input (e.g. manually) or automatically (without user input or intervention, i.e. in response to the processor recognizing that some internal logical condition has been met). In the former case, the storing is in response to receiving user input via a user interface of the mobile device. This user input may be received via the current location indicator displayed on map. Alternatively, storing the location may be done in response to receiving a voice command recognizable by a speech-recognition subsystem of the mobile device. The voice command may be "Save this location", "Record this location", "Drop a breadcrumb", or any other prescribed word, phrase or command. In one embodiment, the mobile device is executing a map application or a navigation application when the input is received. In other embodiments, the device may recognize a location as being significant and then prompt the user either visually or audibly by asking "Do you want to save this location?" or "Drop a breadcrumb here?" or other words to that effect. Voice commands are particularly useful for hands-free operation. For example, the user may wish to record a location while driving. In that case, voice commands are advantageous. The user observing a point of interest, accident, crime or other event may issue a voice command to the mobile device to cause the device to record the location as a breadcrumb location. The mobile device records the breadcrumb location. The user may then issue further voice commands to name or annotate the breadcrumb location with text or a voice memo. The user may issue further voice commands to the mobile device to cause the breadcrumb location to be shared with a friend, family member, office worker, supervisor, or with police or emergency response dispatcher (911/999), etc. Alternatively, the user may share the location at a later time by providing manual input to the device to select the breadcrumb from the map. In one specific embodiment, a single emergency voice command or hotkey may be implemented on the device to cause capture and sharing of breadcrumb locations with emergency response services. In such an embodiment, the processor is configured to cause a radiofrequency transceiver to share the breadcrumb location with emergency services in response to the emergency voice command. The device may optionally be configured to capture time-stamped photos, video, sound, etc. and to send all of this data as part of an emergency report file to the emergency response services.

Storing the location, as noted earlier, may also be performed automatically by the mobile device. Automatic storage may be in response to the mobile device determining that the mobile device has remained at the current location for more than a predetermined amount of time. Alternatively, automatic storage may be in response to detecting that the current location of the mobile device corresponds, within a predetermined distance tolerance, to a frequently visited location or place. For example, the device may learn travel patterns. From those patterns, there may emerge a set of frequently visited places such as the user's home, workplace, cottage, a favourite café, a commonly used gas station, a gym where the user trains, etc. Upon arriving at one of these places, or at least within a prescribed distance of one of these places, the mobile device may "drop a breadcrumb" (i.e. record/store the location).

The breadcrumb locations are reverse geocoded in one main implementation. Thus, the method may further include steps of transmitting a request directly or indirectly (i.e. via any intermediate or proxy server) to a reverse geocoding server to obtain address information for the breadcrumb location. The reverse-geocoding server performs a lookup in a database and returns an address associated with the coordinates. For the purposes of this specification, the address information shall include not only a civic address (e.g. 123 Main Street, Smallville, USA) but also the name of the person or company that is registered at that address. The mobile device thus receives the address information and stores the address information in association with the breadcrumb location. This address information may be displayed onscreen for each breadcrumb location or for a subset of the breadcrumb locations. This technology informs the user of the mobile device as to the address information of the most recent location of the mobile device or of another contact's device without requiring too many calls to the reverse geocoding server. When the device is moving, new location coordinates are being continually provided to the location-management server. To provide instant address updates, the server would have to send very frequent (almost continuous) calls to the reverse geocoding server, which is not practical. By reverse geocoding only the breadcrumbs, the total number of calls to the reverse-geocoding server is greatly reduced. The device still presents fairly recent address information, e.g. for the last breadcrumb location, even if the current location address is unavailable (unless or until that location becomes a new breadcrumb location).

In one implementation, the mobile device displays a map presenting the current location indicator for the mobile device as well as the current locations of other devices that are sharing location data with the mobile device. In other words, there may be multiple users plotted on the map. The map be automatically zoomed to accommodate specified users. In this multi-user scenario, the user of the mobile device may be represented graphically by an avatar (e.g. an icon or graphical representation that the user identifies as being himself or herself for the purposes of distinguishing from the other users (contacts) showing onscreen. Thus, the method may include steps of displaying a map on the mobile device presenting an avatar representing a current location of the mobile device and displaying one or more icons representing respective current locations of other nearby devices that are sharing location information with the mobile device. The avatar and icons may be of different shape, size, color, shading, etc. Labels, names, words, symbols, etc. may also be employed to distinguish the avatar and icons. The icons themselves may be unique to permit the user to visually distinguish one icon from another icon.

The storing of breadcrumb locations of the mobile device may be in response to user input on the avatar.

Similarly, the storing of one or more breadcrumb locations of the other device may be triggered in response to user input on one of the icons associated with one of the other devices. In other words, the user may touch or click on the icon of another device to cause the breadcrumb location to be stored or to cause automatic storage of breadcrumbs for that other device. Automatic storage may be simply to record locations at fixed intervals of time, when the device stops for more than a period of time, or when it arrives at a frequently visited place.

In addition to causing breadcrumbs to be stored, the mobile device may also cause previously stored breadcrumbs to be displayed. Thus, the method may include, in response to user input on the avatar, displaying one or more breadcrumb location indicators representing breadcrumb locations of the mobile device.

Similarly, the method may include, in response to user input on one of the icons, displaying one or more breadcrumb location indicators representing breadcrumb locations of the other device(s).

Further user input on any of the breadcrumb location indicators may cause the device to display a user-selectable action or a menu of user-selectable actions. Thus, the method may further comprise, in response to user input on one of the breadcrumb location indicators, displaying a menu of user-selectable actions with respect to the breadcrumb location, receiving user input selecting one of the actions, and performing the action. The action may be sharing the location, deleting it, naming it or renaming it, etc. A menu of actions may thus comprise one or more of (i) sharing the breadcrumb location; (ii) deleting the breadcrumb location; and (iii) naming the breadcrumb location.

Another action which may be performed in relation to a breadcrumb location is to use the recorded location to 'check-in' to a particular business or place using a social networking application such as Facebook, Four Square etc. In addition to, or instead of sending the breadcrumb location to a reverse-geocoding server, the device uses the breadcrumb location to look-up entities like local businesses or points of interest (POI) within a radius of the breadcrumb location. The user is presented with a list of local businesses or POIs and selects the appropriate one which is recorded in association with their social network profile. In this way, dropping a breadcrumb or recording a location makes it easier for the user to later record and share that location with their social network, at a convenient time without the need to search for the name of the business. Searching requires perfect recollection of the name of the business, and if the user cannot remember the name or spelling of a place then they may be deterred from sharing that location through their social network. In this sense the user is effectively stating they were at a particular place rather than simply sharing their current location.

Social networking application APIs may make use of stored breadcrumb locations when a user indicates they wish to 'check-in', or share the name of a previous location. In addition to providing a list of places near to the current location the user may be presented with an option for "share previous location", or "share breadcrumb location". In addition to sharing the name of the previous location (business or POI), the API may provide the time at which the user was there as this can be recorded when the breadcrumb location was recorded. For example, a user reviewing their stored breadcrumb locations at the end of the day might recall they had a great lunch at a particular location and wish to share that with their social network. Either through selection of the breadcrumb itself of through the social network's API the user can select that breadcrumb location and choose to share it with, or post it in their social network. The user may add a message to provide context to the information they are sharing. Such a post or 'check-in' might read as "Joe Bloggs: had a fantastic lunch today—was full for hours!—at Yummy Cafe 12:30". As such, the breadcrumb location may be shared with a social network and also used to search for content related to the location (e.g. content posted by the user or by others) or to search for nearby entities (businesses or POIs).

Search engine queries may also be formulated using one or more of the breadcrumb locations. In other words, in such an embodiment, the processor may be configured to formulate a search query using the breadcrumb location and to cause the radiofrequency transceiver to transmit the search query and then to receive and display search results for entities (businesses, POIs, etc.) that are near the breadcrumb location(s).

To summarize, touching or clicking on the breadcrumb location indicator may thus perform an action or bring up a menu of selectable actions for the user to select. This technology enables the user of the mobile device to interact not only with his or her own breadcrumbs but also the breadcrumbs of other devices. For example, the user may send/share his own location or send/share somebody else's location (subject to any privacy restrictions set by the user of the other device).

In one specific implementation, the method further entails receiving reverse-geocoded address information for the breadcrumb location and displaying the address information in a text bubble graphically associated with a breadcrumb location indicator of the breadcrumb location. The text bubble (or text field) may be a callout with a line or arrow connecting the text bubble with the breadcrumb location indicator. The text bubble (or text field) may comprise a user-selectable interface element (within the bubble) for sharing the breadcrumb location with a recipient device. Optionally, the text bubble may also comprise a user interface element for selecting the recipient device to receive the breadcrumb location. The display of the text bubble onscreen may persist until a predetermined time has elapsed or until the device has moved a predetermined distance from the location.

In one implementation, performing the action entails automatically transmitting the breadcrumb location to a location-management server that provides reverse-geocoded address information back to the mobile device. The location-management server may include a reverse-geocoding engine and database. Alternatively, the server may communicate with a reverse-geocoding server.

The user of the mobile device may specify with whom the breadcrumb locations are to be shared. Recipients may be selected from a contact list in an address book, from a buddy list in an instant messenger application, from a friend list in a social networking application, etc. User groups may also be defined. Thus, the method may involve receiving user input to specify identities of other devices with which the breadcrumb location may be shared and communicating the identities of the other devices to the location-management server to enable the server to share the breadcrumb location with the other devices.

The address and place name information that is displayed at each breadcrumb location is obtained by reverse geocoding the location coordinates of the device. The reverse geocoding is best done by a reverse geocoding server but may also be done directly on the device itself.

In one implementation, the breadcrumb locations are displayed onscreen with the current location of the mobile device. The current location may be represented by a first graphical location indicator that is labelled or is a visually distinctive icon to indicate that this represents the current location of the device. The graphical location indicator may be an avatar. The recent locations of the device, having been reverse geocoded to provide addresses, are also simultaneously displayed on the map. These may be displayed with different icons. In one embodiment, only one breadcrumb (recent location) is displayed in addition to the current location. In another embodiment, two or more breadcrumbs (recent locations) are displayed in addition to the current location. The number of breadcrumbs may be user-configurable. The number of breadcrumbs to be displayed on the map may also be a function of the available map space, how many other devices are being tracked, etc.

Determining a recent location may be done based on the amount of time that the device has spent at a given location. Locations that are transient (stopping at a traffic light) are generally not be considered as a breadcrumb location. The objective is to distinguish transient stops from places the device has actually visited. The time spent at a location or within a predetermined radius of the location may thus be used to determine if the location was transient or a place that the user has visited such as a café, restaurant, hotel, place of work, store, home, etc. The device may be configured to filter out any transient stops by applying a time threshold. For example, any stop that is less than e.g. 1, 2, 3, 5 or 10 minutes or any other suitable period of time, may be discarded as merely a transient stop. The time threshold may be user-configurable or adaptable to user travel patterns.

Another approach is to rank the most recent stops according to their length of time (or a history of recurring visits to assess their significance).

Another approach is to confine the breadcrumb analysis to a certain area of interest. For example, the area of interest may be defined by a bounding box at a certain zoom level. For example, the user may display a map at a certain zoom level of his own current location and wish to see any contacts who are nearby. The contacts' breadcrumbs for the area of interest is then computed.

In a further refinement, the method may involve interpolating between two breadcrumb locations. For example, if a user is interested in a location between two consecutive breadcrumbs (e.g. "Where I was 10 minutes after I passed that intersection?") the device can estimate the address and time of that location based on information from the previous and subsequent breadcrumbs that span the location of interest. The estimated location information may be reverse-geocoded to obtain an estimated address for the interpolated location. In one embodiment, the user may click or touch a spot on the map between two successive breadcrumb locations to cause the interpolation function to be launched by the mobile device.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method performed by a mobile device, the method comprising:
    determining a current location of the mobile device;
    storing the current location as a recorded location of the mobile device;
    displaying a map presenting both a current location indicator representing the current location of the mobile device and one or more recorded location indicators representing respective recorded locations of the mobile device, wherein each recorded location indicator is a user-selectable interface element that is responsive to user input to cause the mobile device to display a menu on the map comprising one or more actions performable with respect to the recorded location associated with the respective recorded location indicator, including an action for sharing the recorded location;

in response to user input received by the user-selectable interface element, displaying the menu of the one or more actions; and in response to selection of an action from the menu, performing the action with respect to the recorded location when the mobile device has moved away from the recorded location.

2. The method as claimed in claim 1 wherein the selection of the action for sharing the recorded location causes the recorded location to be available for sharing with one or more electronic devices.

3. The method as claimed in claim 1 wherein the display menu comprises an action for deleting the selected recorded location, and wherein the selection of the action for deleting comprises deleting the selected recorded location.

4. The method as claimed in claim 1 wherein the displayed menu comprises an action for naming the selected recorded location, and wherein the selection of the action for naming comprises naming the selected recorded location.

5. The method as claimed in claim 1 wherein the displayed menu comprises an action for defining a location-based alert for the selected recorded location, and wherein the selection of the action for the alert comprises defining a location-based alert for the selected recorded location, the alert comprising a notification that the mobile device has returned to the selected recorded location.

6. The method as claimed in claim 5 wherein the notification is communicated wirelessly to another device.

7. The method as claimed in claim 5 wherein defining the location-based alert comprises drawing a geofence around the recorded location indicator.

8. The method as claimed in claim 1 wherein storing the location is in response to receiving user input via a user interface of the mobile device.

9. The method as claimed in claim 1 wherein storing the location is in response to receiving user input via the current location indicator displayed on map.

10. The method as claimed in claim 1 wherein storing the location is in response to receiving a voice command recognizable by a speech-recognition subsystem of the mobile device.

11. The method as claimed in claim 1 wherein storing the location is performed automatically by the mobile device in response to the mobile device determining that the mobile device has remained within a predetermined radius of the current location for more than a predetermined amount of time.

12. The method as claimed in claim 1 wherein storing the location is in response to detecting that the current location of the mobile device corresponds, within a predetermined distance tolerance, to a frequently visited location.

13. The method as claimed in claim 1 further comprising:
transmitting a request to a reverse geocoding server to obtain address information for the recorded location;
receiving the address information; and
storing the address information in association with the recorded location.

14. The method as claimed in claim 1 further comprising:
displaying a map on the mobile device presenting an avatar representing a current location of the mobile device; and
displaying one or more icons representing respective current locations of other nearby devices that are sharing location information with the mobile device.

15. The method as claimed in claim 14 further comprising:
in response to user input on one of the icons associated with one of the other devices, storing one or more recorded locations of the other device.

16. The method as claimed in claim 14 further comprising:
in response to user input on the avatar, displaying one or more recorded location indicators representing recorded locations of the mobile device.

17. The method as claimed in claim 16 further comprising:
in response to user input on one of the recorded location indicators, displaying a menu of user-selectable actions with respect to the recorded location;
receiving user input selecting one of the actions; and
performing the action.

18. The method as claimed in claim 17 wherein the menu of actions comprises one or more of (i) sharing the recorded location; (ii) deleting the recorded location; and (iii) naming the recorded location.

19. The method as claimed in claim 14 further comprising:
in response to user input on one of the icons, displaying one or more recorded location indicators representing recorded locations of the other device.

20. The method as claimed in claim 19 further comprising:
in response to user input on one of the recorded location indicators, displaying a menu of user-selectable actions with respect to the recorded location;
receiving user input selecting one of the actions; and
performing the action.

21. The method as claimed in claim 20 wherein the menu of actions comprises one or more of (i) sharing the recorded location; (ii) deleting the recorded location; and (iii) naming the recorded location.

22. The method as claimed in claim 21 further comprising:
receiving user input to specify identities of other devices with which the recorded location may be shared; and
communicating the identities of the other devices to the location-management server to enable the server to share the recorded location with the other devices.

23. The method as claimed in claim 22 further comprising:
receiving user input to specify privacy parameters relating to how recorded locations are to be transmitted to the server and shared with the other devices; and
communicating the privacy parameters to the location-management server to enable the server to share the recorded location with the other devices in accordance with the privacy parameters.

24. A non-transitory computer-readable medium comprising instructions in code which when loaded into a memory and executed by a processor of a mobile device cause the mobile device to:
determine a current location of the mobile device;
store the current location as a recorded location of the mobile device;
display a map presenting both a current location indicator representing the current location of the mobile device and one or more recorded location indicators representing respective recorded locations of the mobile device, wherein each recorded location indicator is a user-selectable interface element that is responsive to user input to cause the mobile device to display a menu on the map comprising one or more actions performable with respect to the recorded location associated with the respective recorded location indicator including an action for sharing the recorded location;
in response to user input received by the user-selectable interface element, display the menu of the one or more actions; and
in response to selection of an action from the menu, perform the action with respect to the recorded location when the mobile device has moved away from the recorded location.

25. A mobile device comprising:
a position-determining subsystem for determining a current location of the mobile device;
a memory for storing the current location as a recorded location of the mobile device; and
a processor coupled to the memory for causing the mobile device to:
display a map presenting both a current location indicator representing the current location of the mobile device and one or more recorded location indicators representing respective recorded locations of the mobile device, wherein each recorded location indicator is a user-selectable interface element that is responsive to user input to cause the mobile device to display a menu on a map comprising one or more actions performable with respect to the recorded location associated with the respective recorded location indicator, including an action for sharing the recorded location;
in response to user input received by the user-selectable interface element, display the menu of the one or more actions; and
performing the action with respect to the recorded location when the mobile device has moved away from the recorded location.

* * * * *